(12) United States Patent
Wojtkiewicz

(10) Patent No.: US 7,143,173 B2
(45) Date of Patent: Nov. 28, 2006

(54) AUTODETECTION OF ROUTING PROTOCOL VERSION AND TYPE

(75) Inventor: Waldemar Wojtkiewicz, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 1224 days.

(21) Appl. No.: 09/751,497

(22) Filed: Dec. 29, 2000

(65) Prior Publication Data

US 2002/0087703 A1 Jul. 4, 2002

(51) Int. Cl.
*G06F 15/173* (2006.01)

(52) U.S. Cl. ........................ 709/228; 709/230
(58) Field of Classification Search ......... 709/236–238, 709/227–228, 242, 220, 249, 226, 223, 224; 370/252, 401, 392, 258, 256
See application file for complete search history.

(56) References Cited

U.S. PATENT DOCUMENTS

| | | | | | |
|---|---|---|---|---|---|
| 5,920,699 | A | * | 7/1999 | Bare | 709/225 |
| 6,104,713 | A | * | 8/2000 | Nagami et al. | 370/392 |
| 6,105,068 | A | * | 8/2000 | Naudus | 709/228 |
| 6,167,444 | A | * | 12/2000 | Boden et al. | 709/223 |
| 6,243,759 | B1 | * | 6/2001 | Boden et al. | 709/238 |
| 6,421,731 | B1 | * | 7/2002 | Ciotti et al. | 709/238 |
| 6,590,894 | B1 | * | 7/2003 | Kerr et al. | 370/392 |
| 6,650,626 | B1 | * | 11/2003 | Cain | 370/256 |
| 6,684,241 | B1 | * | 1/2004 | Sandick et al. | 709/220 |
| 6,697,360 | B1 | * | 2/2004 | Gai et al. | 370/389 |
| 2003/0026268 | A1 | * | 2/2003 | Navas | 370/400 |

OTHER PUBLICATIONS

Naik, Dilip C., *Internet Standards and Protocols*, pp. 54–61, Microsoft Press, 1998, U.S.A.
Hedrick, C., *Routing Information Protocol*, pp. 1–33, RFC 1058, Rutgers University, 1988, U.S.A.
Malkin, G., *RIP Version 2*, pp. 1–39, RFC 2453, Bay Networks, 1998, U.S.A.
Meyer, G., *Triggered Extensions to RIP to Support Demand Circuits*, RFC 2091, Shiva, 1997 U.S.A.
Baker, F., *RIP–2 MD5 Authentication*, pp. 1–9, RFC 2082, Cisco Systems, 1997, U.S.A.
Malkin, G., *RIP Version 2 MIB Extension*, pp. 1–14, RFC 1724, Cisco Systems, 1994, U.S.A.
Semeria, C., *Understanding IP Addressing; Everything You Ever Wanted to Know*, pp. 1–52, 3COM, 1996, U.S.A.

* cited by examiner

*Primary Examiner*—Abdullahi E. Salad
(74) *Attorney, Agent, or Firm*—Blakely, Sokoloff, Taylor & Zafman LLP

(57) ABSTRACT

Methods and apparatuses to automatically configure network devices with respect to the routing protocol versions and types of each device on a link. The routing protocol is a dynamic, intradomain, distributed, flat, single path, distance vector routing protocol such as the Routing Information Protocol (RIP). A link including a first network device and a second network device can be configured automatically. Each network device includes a routing protocol having a version and a type. The network devices are configured such that the routing protocol versions of the first and second network devices are the same and the types of the routing protocol versions are the same. A RIP link can be configured to set both sides of a dial-on-demand link to triggered RIP version 2, or another version and type combination.

18 Claims, 2 Drawing Sheets

AUTODETECTION OF ROUTING PROTOCOL VERSION AND TYPE

FIELD OF THE INVENTION

The invention relates generally to networked devices. More particularly, the invention relates to detection and configuration of routing protocol versions and types.

BACKGROUND OF THE INVENTION

In network devices it is important to configure each device in the network properly. If there is any misconfiguration, the network may not work properly. For instance, some devices may have problems connecting or communicating with other devices. The trend in network device manufacturing is to make the configuration process less time consuming and as easy as possible. This is why the idea of "Plug And Play" is very popular and accepted.

In general, a network can include many devices and types of devices, such as computers, printers, servers, switches, and the like, that are interconnected and that can communicate with each other. Also, separate networks can be connected to each other. Typically, separate networks can be connected via a network device such as a router.

Routers are electronic systems that determine the next network point to which a packet should be forwarded toward the packet's destination. Routers are connected to at least two networks and decide which way to send each information packet based on the router's current understanding of the state of the networks it is connected to. Routers can be combined and can include additional components. A router creates or maintains a table of the available routes and their conditions and uses this information along with distance and cost algorithms to determine the best route for a given packet. Typically, a packet may travel through a number of network points with routers before arriving at its destination.

Routers connect networks using a number of methods known in the art. The connection between the routers might be a dial-up connection or a leased line connection. The line can be an XDSL, ATM, Frame Relay, ISDN, X.25, or any other type of line. A router operates at the network layer (layer 3) of the ISO/OSI seven-layer model. Dilip C. Naik, Internet Standards and Protocols, p. 55 (1998).

Routers perform a variety of functions including verifying validity of data packets, queuing a packet for delivery, forwarding the packet, and exchanging routing information with other routers. Routers also typically consult a data structure called a "routing table" to see where the data packet should go next. A routing table can quickly identify a port over which a data packet should be sent if a destination address is known. Id.

Various routing algorithms are used to update the routing table to reflect changes in network topology. Routing protocols implement routing algorithms. Routing protocols operate on network protocols such as IP and Internet Packet Xchange (IPX). Id.

One type of routing protocol is the Routing Information Protocol (RIP). RIP is a protocol used in small and medium sized IP networks for advertising IP routing information. RIP is a dynamic, intradomain, distributed, flat, single path, distance vector routing protocol. Id. RIP is a simple and widely used protocol that uses periodic advertisements. In one network there may be many RIP routers advertising RIP routes periodically.

There are currently two versions of the RIP. RIP version 1 is described in Hedrick, C., "Routing Information Protocol," RFC 1058 Rutgers University, June, 1988 (RFC 1058), and RIP version 2 is described in Malkin, G., "RIP Version 2," RFC 2453, Bay Networks, November, 1998 (RFC 2453). Additionally, there is a modification of RIP for Dial on Demand (DoD) links called Triggered RIP, which is described in Meyer, G., et al., "Triggered Extensions to RIP to Support Demand Circuits," RFC 2091, Shiva, January, 1997 (RFC 2091).

BRIEF DESCRIPTION OF THE DRAWINGS

The invention is illustrated by way of example, and not limitation, in the figures of the accompanying drawings in which.

DETAILED DESCRIPTION

Figure 1:
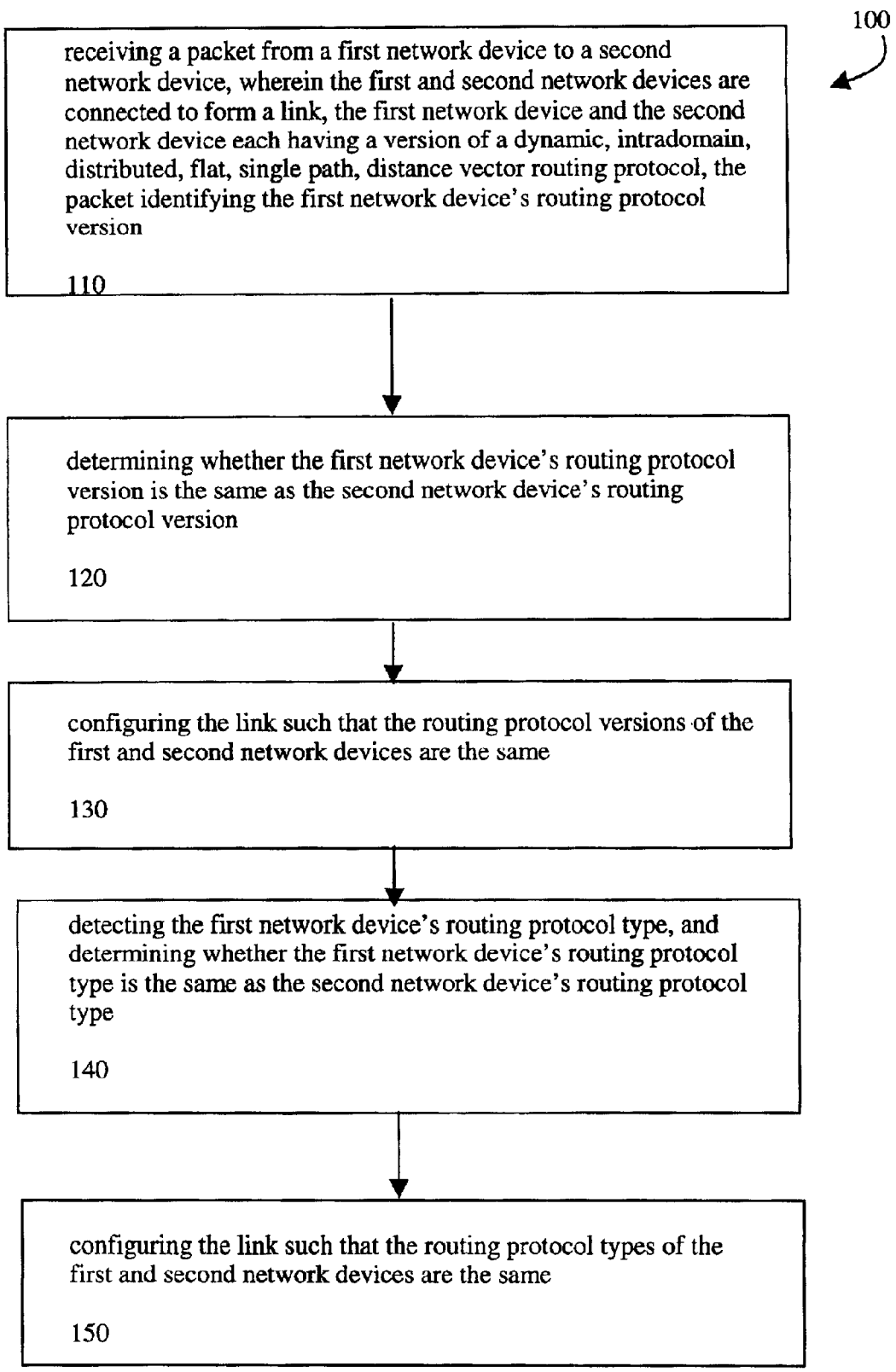
FIG. 1 is a flowchart showing an embodiment of a method of the present invention.

Embodiments of the invention described herein provide methods and apparatuses to automatically configure network devices with respect to the routing protocol versions and types of each device on a link. One embodiment of the invention includes configuring a link including a first network device and a second network device. Each network device includes a routing protocol having a version and a type. The network devices are configured such that the routing protocol versions of the first and second network devices are the same and the types of the routing protocol versions are the same.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description which follows are presented in terms of algorithms and symbolic representations of operations on data within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the following discussion throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. These apparatuses may be specially constructed for the required purposes, or may comprise a general-purpose computer selectively activated or reconfigured by a computer program stored in the computer. Such a computer program may be stored in a machine-readable or accessible storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices, electrical, optical, acoustical or other form of propagated signals (e.g., carrier waves, infrared signals, digital signals, etc.); etc. or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
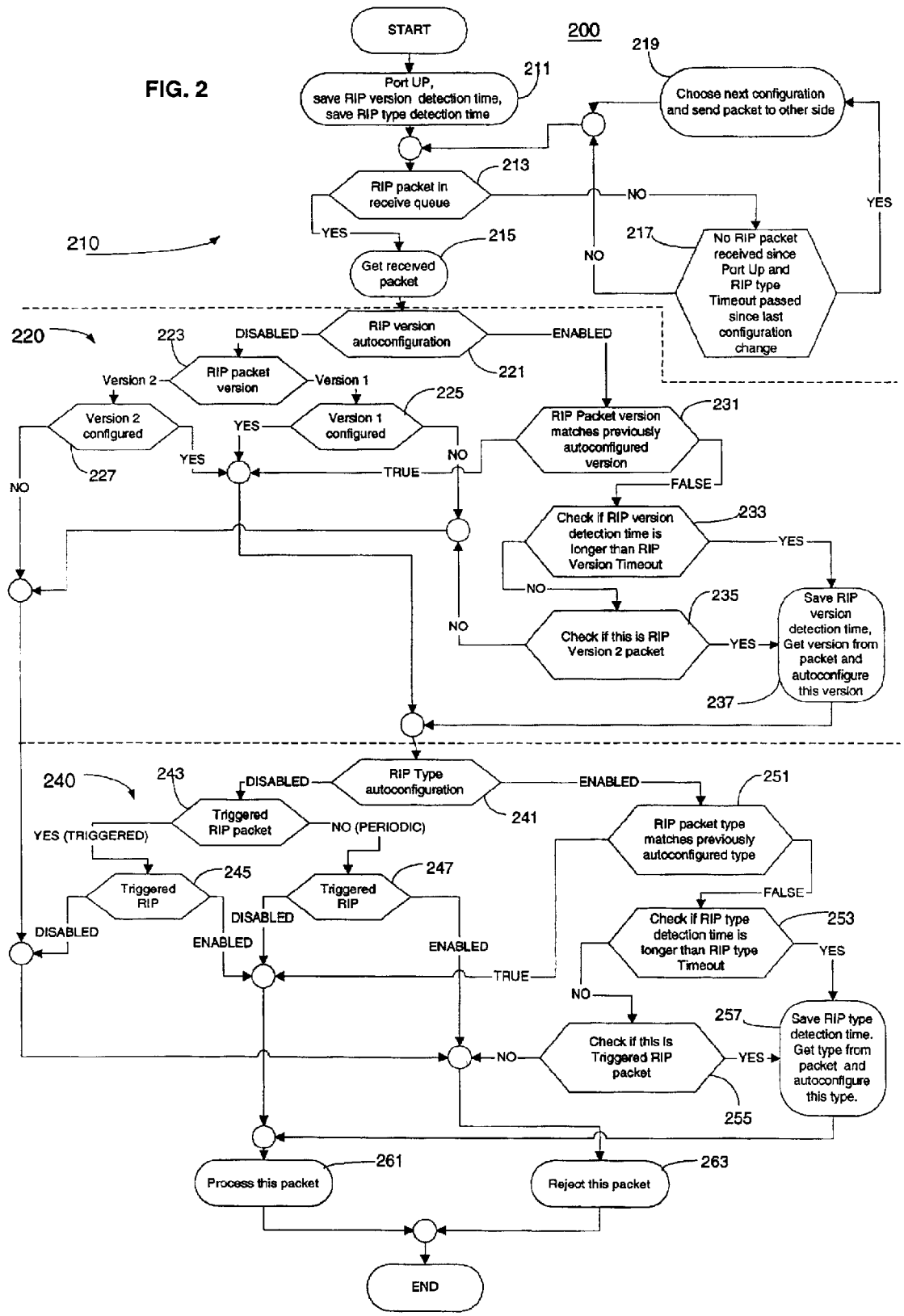
FIG. 2 is a flowchart showing an embodiment of a method of the present invention.

FIGS. 1 and 2 show flowcharts of exemplary embodiments of methods of the present invention in which the various blocks represent operations or procedures to perform the methods.

Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or a produce a result.

In one embodiment, two or more exemplary network devices such as routers form a link connecting two or more networks. For simplicity of description, the term "link" will be used herein to include two network devices such as routers. It should be noted, however, that typically more than two routers can be "linked" to connect several networks.

Routers can include an exemplary routing protocol referred to as the Routing Information Protocol (RIP). Currently, there are two versions of the RIP. The RIP on each device may be either version 1 or version 2. Moreover, each version of RIP can be of a periodic type or a triggered type. Periodic RIP advertises to the network at preselected periodic intervals, such as every 30 seconds. Triggered RIP advertises to the network upon the occurrence of an event such as a change in the network topology, for example.

One example of a way to connect routers is known as a "Dial on Demand" (DoD) link. A DoD link is a point-to-point connection between two switches via a wide area network (WAN) line. The connection is in an IDLE state (disconnected) when there is no traffic. Data transmission establishes connection and line enters an ACTIVE state (connected). This saves money for connection when the line is charged for time of use.

An embodiment of a method of the invention can be described with reference to the flowchart shown in FIG. 1, in which an embodiment of the method 100 constitutes processes and operations represented by block 110 until block 150. Embodiments of the method may constitute computer programs made up of computer-executable instructions illustrated as blocks 110 until 150 in FIG. 1. It should be noted that the various blocks shown in FIG. 1 need not be executed in the order shown in FIG. 1 and that every operation represented by the blocks of FIG. 1 may not be necessary for every embodiment of the present invention.

Block 110 shows the operation of receiving a packet from a first network device to a second network device. The first network device and the second network device each have a version of a routing protocol. The packet identifies the first network device's routing protocol version. When the first and second network devices are connected, they form a link.

In the embodiment in which the routing protocol is RIP, for example, the routing protocol version can be version 1 or version 2 or a subsequent version if one becomes available. Preferably, at least the second network device can be set to use either RIP version 1 or RIP version 2.

Block 120 shows the operation of determining whether the first network device's routing protocol version is the same as the second network device's routing protocol version. Block 130 shows the operation of configuring the link such that the routing protocol versions of the first and second network devices are the same. In the embodiment of a network link in which RIP is the routing protocol, if both the first network device and the second network device are able to use either version 1 or version 2, the method can include choosing version 2 as the default or preferred version for both network devices. Currently, version 2 is a more recent version of RIP and is generally preferred over version 1.

Block 140 shows the operation of detecting the first network device's routing protocol type, and determining whether the first network device's routing protocol type is the same as the second network device's routing protocol type. In the case of RIP, the type can be periodic or triggered. Block 150 shows the operation of configuring the link such that the routing protocol types of the first and second network devices are the same. This operation can include setting the routing protocol type of the first network device to be the same as that of the second network device or vice versa. If one of the first or second network device routing protocol types is fixed, i.e., cannot be set to be the same as that of the other network device, then the routing protocol type of the network device that can be changed should be set to match the fixed device.

The operations represented by blocks 140 and 150 of method 100 are particularly useful when the link including the first network device and the second network device is a Dial on Demand (DoD) link. A fixed point-to-point link that is always active can accommodate either the periodic type or triggered type of RIP. However, periodic advertisement is generally not used over on-demand links because a DoD link is only active when an event occurs that necessitates transferring of a packet of information between the two network devices. At other times, the link is idle. Triggered advertisements are sent when certain events occur. A change in database information, a port state change, and a change of IP port configuration are examples of such events.

The configurations can be changed in a predefined way. In one embodiment, the method can include a hierarchy of possible configurations, e.g., from the "best" configuration to the "worst." Generally, the best configuration is Triggered RIP version 2 and the worst is Periodic RIP version 1. When the worst configuration is reached and there is still no response from the other side then the process can be repeated or any default configuration can be left unchanged.

The behavior of the autoconfiguration need not be determined in the case when there is no response from other side. There may be different solutions that can be applied according to special requirements of a particular configuration or network or link. Implementation of the method of the invention is flexible and the specific parameters can be left to the designer. Preferably, the autoconfiguration is always restarted after a Port UP event or a Port Enable event.

An embodiment of a method of the invention can be described with reference to the flowchart shown in FIG. 2, in which an embodiment of the method 200 constitutes processes and operations represented by block groups 210, 220, and 240. Embodiments of the method may constitute computer programs made up of computer-executable instructions illustrated as block groups 210, 220, and 240 in FIG. 2. It should be noted that various blocks shown in FIG. 2 need not be executed in the order shown in FIG. 2 and that every operation represented by the blocks of FIG. 2 may not be necessary for every embodiment of the present invention.

The exemplary embodiment of method 200 shown in FIG. 2 is described using RIP as the exemplary routing protocol. FIG. 2 shows one method of automatically detecting the RIP version and type of a network device in a link with another network device and automatically configuring the link.

Block group 210 includes the operations and processes of the beginning of a method 200. Block group 210 includes a starting operation shown in block 211 in which a port becomes active or "up" and the RIP version detection time and RIP type detection time are saved. Next, if a RIP packet is received in queue (block 213), an operation is performed (block 215) which will get the received packet. If no RIP packet is received in queue (block 213), the method includes checking whether no RIP packet was received since the port became active and whether the RIP type timeout has passed since the last configuration change (block 217). If no RIP packet was received since the port became active and the type RIP timeout has passed since the last configuration change, the method further includes choosing the next configuration and sending the packet to the other side (i.e., other network device of the link) (block 219). If a RIP packet has been received since the port became active and the RIP type timeout has passed since the last configuration change, the queue is again checked to see whether a RIP packet has been received (block 213). Once a RIP packet has been received in queue and the operation is performed that gets the received packet (block 215), the method may proceed to block group 220.

Block group 220 shown in FIG. 2 includes an example of processes or operations that perform automatic detection (autodetection) of the RIP version and automatic configuration (autoconfiguration) with respect to the RIP version. In block 221, if the RIP version autodetection is disabled, the method proceeds to an operation or process that determines the version of the RIP packet received (block 223). If it is determined that the RIP packet version is version 1, the method determines whether version 1 is configured (block 225). If version 1 is configured, the method may proceed to the processes or operations of block group 240. If version 1 is not configured, the packet is rejected.

If it is determined at block 223 that the RIP packet version is version 2, the method determines whether version 2 is configured (block 227). If version 2 is configured, the method proceeds to the processes or operations of block group 240. If version 2 is not configured, the packet is rejected.

If the RIP version autoconfiguration has been enabled (block 221), the method proceeds to processes or operations that configure the link so that the network devices on the link have the same version of the routing protocol. The method determines whether the received RIP packet version matches the previously configured (or autoconfigured) version (block 231). If the RIP packet version matches the previously configured version, the method proceeds to the processes or operations of block group 240. If the RIP packet version does not match the previously configured version, the method checks if the RIP version detection time is longer than the RIP version timeout (block 223).

If the RIP version detection time is not longer than the RIP version timeout, the method checks if this packet is a RIP version 2 packet (block 235). If it is not a RIP version 2 packet, the packet is rejected. If it is a RIP version 2 packet (block 235), or if the RIP version detection time is longer than the RIP version timeout (block 233), the RIP version detection time is then saved and an operation is performed that gets the version from the packet and autoconfigures this version (block 237). Then the method may proceed to the operations or processes shown in block group 240.

Block group 240 shown in FIG. 2 includes an example of processes or operations that perform autodetection and autoconfiguration of the RIP type.

In block 241, if RIP type autoconfiguration is disabled, the method performs an operation or process to determine whether the packet is a triggered RIP (T-RIP) packet (block 243). If it is a T-RIP packet, the method checks whether T-RIP is enabled or disabled (block 245). If T-RIP is disabled, the packet is rejected (block 263). If T-RIP is enabled, the packet is processed (block 261). If it is not a T-RIP packet (block 243), the method also checks whether T-RIP is enabled or disabled (block 247). In this case, if T-RIP is disabled, the packet is processed (block 261); and if T-RIP is enabled, the packet is rejected (block 263).

Block group 240, and in particular, blocks 243 through 247, shows that if RIP type autoconfiguration is disabled, then only RIP packets that match the current setting are accepted. For example, if T-RIP is expected then only T-RIP packets are processed. If T-RIP is disabled then only periodic packets are processed.

If, at block 241, it is determined that RIP type autoconfiguration is enabled, the method performs a process or operation to determine whether the RIP packet type matches the RIP packet type previously configured (block 251).

If the RIP packet type is equal to the previously autoconfigured RIP type then the packet is processed (block 261). If the RIP packet is not equal to the previously autoconfigured RIP type (block 251), the method checks whether the RIP type detection time is longer than the RIP type timeout (block 253).

If the RIP type detection time is not longer than the RIP type timeout, the method checks if the packet is a T-RIP packet (block 255). If it is not a T-RIP packet, it is rejected (block 263).

If the packet is a T-RIP packet (block 255), or if the RIP type detection time is longer than the RIP type timeout (block 253), the RIP type detection time is saved, and the method gets the type from the packet and autoconfigures this type (block 257). The packet is then processed (block 261).

The above embodiments can be used to properly configure both sides of a link in order to achieve proper working of routers over a link such as a DoD link using a routing protocol such as RIP. To make configuration easier, the detection and configuration processes or operations are done automatically. In many cases, it would be enough to connect two routers via a DoD connection and wait while the operations or processes of auto-negotiation (i.e. detection and determination of versions and types of the routing protocols) finish configuring the link. It is also very easy to change DoD IP settings because it is enough to do it only on one side, because the other side will adjust its settings automatically. The various embodiments of the methods of the present invention can be referred to as "Plug And Play" extensions to IP configuring on DoD links.

With the method of the present invention, in many cases the DoD links need not be manually configured. One example of the use of the embodiments of the present invention, includes the situation in which a failed router to be replaced. The LAN(s) and DoD(s) need to be configured when a new router is installed. First, LAN should be configured in order to connect your Simple Network Management Protocol (SNMP) station. Next, proper RIP parameters must be set on the DoD links. In the event that it is not known what are the settings on the other side of the DoD (it is after-hours, for instance, or no one is available to provide the information, and the Network diagram cannot be found), the connection to other side of the DoD cannot be made because it is not configured yet. Moreover, previous settings on the failed device cannot be checked because it is broken down. The only knowledge about the link is that it was an Unnumbered link. In this example, there are 4 possible configurations of the routing protocol and type: 1) RIP version 1; 2) RIP version 1 with Triggered RIP; 3) RIP version 2; or 4) RIP version 2 with Triggered RIP.

A manual solution is to try each configuration in turn. This is time consuming. The automatic method of the present invention can be selected to start just after the DoD interface connection is made. Once the LAN is configured, the DoD will be ready.

In another exemplary situation, after the DoD is configured (either automatically or manually), it may be desirable to change the configuration. In this case, it is enough to change only one side of the link. The other will be configured automatically.

In another exemplary situation, when two new routers connected with default settings via a DoD connection, they will negotiate the best protocol which is Triggered RIP version 2. When autodetection is finished the configured setting can be selected if desired.

The methods and apparatuses of the present invention are intended to work with other devices not supporting autodetection (backward compatibility).

What is claimed is:

1. A method, comprising:
    receiving a packet from a first network device to a second network device, wherein the first and second network devices are connected to form a link, the first network device and the second network device each having a version of a routing protocol, the packet identifying the first network device's routing protocol version;
    determining whether the first network device's routing protocol version is the same as the second network device's routing protocol version;
    verifying the first network device's routing protocol version as being the same as the second network device's routing protocol version;
    choosing the same routing protocol version acceptable to the first and second network devices; and
    configuring the link such that the routing protocol version is the same for the first and second network devices, wherein the version of the routing protocol of each network device is one of a triggered type or a periodic type, and the method further comprises detecting the first network device's routing protocol type, and determining whether the first network device's routing protocol type is the same as the second network device's routing protocol type.

2. The method of claim 1, further comprising configuring the link such that the routing protocol version of the first and second network devices comprises a default routing protocol version or a preferred routing protocol version.

3. The method of claim 1, wherein the routing protocol comprises a Routing Information Protocol (RIP).

4. The method of claim 3, wherein the version of RIP comprises one of Version 1 or Version 2.

5. The method of claim 4, wherein the version of the RIP of each of the first and second network devices is one of a triggered type or a periodic type.

6. A machine-readable medium having stored thereon sets of instructions which, when executed by a machine, cause the machine to:
    receive a packet from a first network device to a second network device, wherein the first and second network devices are connected to form a link, the first network device and the second network device each having a version of routing protocol, the packet identifying the first network device's routing protocol version;
    determine whether the first network device's routing protocol version is the same as the second network device's routing protocol version;
    verify the first network device' routing protocol version as being the same as the second network device's routing protocol version;
    choose the same routing protocol version acceptable to the first and second network devices; and
    configure the link such that the routing protocol version is the same for the first and second network devices, wherein the version of the routing protocol of each network device is one of a triggered type or a periodic type, and the set of instructions which, when executed by the machine, further cause the machine to detect the first network device's routing protocol type, and to determine whether the first network device's routing protocol type is the same as the second network device's routing protocol type.

7. The machine-readable medium of claim 6, wherein the sets of instructions which, when executed by the machine, further cause the machine to configure the link such that the routing protocol version of the first and second network devices comprises a default routing protocol version or a preferred routing protocol version.

8. The machine-readable medium of claim 6, wherein the routing protocol comprises a Routing Information Protocol (RIP).

9. The machine-readable medium of claim 8, wherein the version of RIP comprises one of Version 1 or Version 2.

10. The machine-readable medium of claim 8 wherein the version of the RIP of each of the first and second networkdevices is one of a triggered type or a periodic type.

11. An apparatus, comprising:
a second network device to receive a packet from a first network device, wherein the first and second network devices are connected to form a link, the first network device and the second network device each having a version of routing protocol, the packet identifying the first network device's routing protocol version; and
a processor coupled with the first and second network devices, the processor to
determine whether the first network device's routing protocol version is the same as the second network device's routing protocol version,
verify the first network device' routing protocol version as being the same as the second network device's routing protocol version,
choose the same routing protocol version acceptable to the first and second network devices, and
configure the link such that the routing protocol version is the same for the first and second network devices, wherein the version of the routing protocol of each network device is one of a triggered type or a periodic type, and the processor is further to detect the first network device's routing protocol type, to determine whether the first network device's routine protocol type is the same as the second network device's routing protocol type.

12. The apparatus of claim 11, wherein the processor is further to configure the link such that the routing protocol version of the first and second network devices comprises a default routing protocol version or a preferred routing protocol version.

13. The apparatus of claim 12, wherein the version of RIP comprises one of Version 1 or Version 2.

14. The apparatus of claim 11, wherein the routing protocol comprises a Routing Information Protocol (RIP).

15. A system, comprising:
a second network device to receive a packet from a first network device, wherein the first and second network devices are connected to form a link, the first network device and the second network device each having a version of routing protocol, the packet identifying the first network device's routing protocol version;
a processor coupled with the storage medium and the list and second network devices, the processor to
determine whether the first network device's routing protocol version is the same as the second network device's routing protocol version,
verify the first network device' routing protocol version as being the same as the second network device's routing protocol version,
choose the same routing protocol version acceptable to the first and second network devices, and
configure the link such that the routing protocol version is the same for the first and second network devices, wherein the version of the routing protocol of each network device is one of a triggered type or a periodic type, and the processor is further to detecting the first network device's routing protocol type, and to determine whether the first network device's routing protocol type is the same as the second network device's routing protocol type; and
a storage medium coupled with the processors the storage medium to store instructions to facilitate the processor to determine, verify, choose, and configure.

16. The system of claim 15, wherein the processor is further to configure the link such that the routing protocol version of the first and second network devices comprises a default routing protocol version or a preferred routing protocol version.

17. The system of claim 16, wherein the version of RIP comprises one of Version 1 or Version 2.

18. The system of claim 15, wherein the routing protocol comprises a Routing information Protocol (RIP).

* * * * *

UNITED STATES PATENT AND TRADEMARK OFFICE
CERTIFICATE OF CORRECTION

| | |
|---|---|
| PATENT NO. | : 7,143,173 B2 |
| APPLICATION NO. | : 09/751497 |
| DATED | : November 28, 2006 |
| INVENTOR(S) | : Wojtkiewicz |

It is certified that error appears in the above-identified patent and that said Letters Patent is hereby corrected as shown below:

In column 8, at line 37, delete "arc" and insert --are--.

Signed and Sealed this

Fourteenth Day of April, 2009

JOHN DOLL
*Acting Director of the United States Patent and Trademark Office*